Patented Mar. 4, 1941

2,233,447

UNITED STATES PATENT OFFICE 2,233,447

WASHING FRUIT

Clarence D. Dolman, Chelan County, Wash., assignor to Hercules Glue Company, a corporation of California No Drawing. Application January 24, 1940,
Serial No. 315,329

12 Claims. (Cl. 99—103)

This invention relates to the removal of spray residues from fruit and like articles. This application is a continuation-in-part of my allowed application Serial Number 236,801.

As is well known, to control pests, sprays are applied to fruit. One of the steps necessary to preparation of the fruit for market is reduction in the spray residue on the fruit surface to below a governmentally set maximum limit. Hydrochloric acid solutions, solutions containing sodium silicate or soda ash have generally been used for removing such residues. The effectiveness of these solutions is not particularly great and it has been found necessary to carry their temperatures so high, to secure proper cleansing of the fruit, that considerable damage to the fruit and loss to the producers has ensued.

The spray residue removal problem has been further increased by the recently developed practice of applying to the fruit insecticide solutions or suspensions which include considerable amounts of oily and fatty materials mixed therewith. This practice is further disclosed in my copending application Serial Number 236,562. The application of such insecticide suspensions or solutions has lead to extremely closely adhering layers of insecticide on the fruit. This in turn has enhanced the spray removal difficulty.

I have discovered that by initially wetting the fruit with a solution of an amphoteric metal in the form of a water soluble salt, prior to application of one of the usual spray removal solutions, and thereafter bringing the fruit, wet with a sufficient quantity of the amphoteric metal salt solution, into an alkaline or an acid solution whereby an amphoteric hydroxide is formed on the fruit surface the remaining spray residue on the fruit is readily removed. For example, I have found that by initially wetting the fruit with a water solution containing from one-half pound to twenty pounds of aluminum sulphate, ammonium aluminum sulphate, ammonium iron sulphate, potassium aluminum sulphate, ferric sulphate, ferric chloride chlorinated ferrous sulphate, ferric aluminum sulphate, sodium aluminum sulphate, or a like material, for each one hundred gallons of water, the spray residue can then be quickly removed by a subsequent alkaline bath such as a water solution of sodium silicate, sodium hydroxide or soda ash, or an acid bath such as is provided by a citric acid, hydrochloric acid, acetic acid, nitric acid, or sulfuric acid bath.

In stating that the fruit is initially wetted with a solution containing the materials heretofore mentioned, I do not wish to be understood to mean that the fruit cannot be wetted prior to contact with this solution. However, what I do mean is that the solutions mentioned are applied before the usual cleaning solutions. Apparently what occurs, and this is set forth by way of explanation only, without wishing to be bound thereby or limited thereby, is that the initial treating solution, containing amphoteric metals forming flocculent hydroxides, becomes sorbed upon the surface of the spray residue and upon the fruit surface. Upon the so-wetted fruit passing into the acid or alkaline bath, the flocculent hydroxide is formed. This facilitates removal of the spray coating.

I am familiar with the practice of including a carbonate material in the spray residue applied so that, upon the material being passed through an acid bath, the carbonate is decomposed to the water soluble chloride and $CO_2$ liberated. The theory is that $CO_2$ liberation assists in breaking up the spray residue. However, this has not proven satisfactory on the spray materials mentioned, and the practice of the present invention supplants this employment of inert carbonates.

In treating apples heavily sprayed according to the present practice, I placed 27 pounds of aluminum sulphate in a 130 gallon tank. The fruit was passed through this solution, washed, and then into a tank containing a 7% sodium silicate solution. The fruit was then washed in fresh water and passed through a tank containing a 1% hydrochloric acid solution. The fruit was then further washed with fresh water and finally dried and packed. The spray residue was reduced satisfactorily, and below the governmental maximum tolerance. The temperature of the solutions employed was not raised above room temperature, so that no danger of harm to the fruit from the high temperature solution was present. Instead of employing the sodium silicate bath, the fruit wet with an amphoteric metal salt solution can be advantageously passed directly into the acid bath. So long as the subsequent bath is definitely acid or alkaline, the amphoteric hydroxide is formed. The subsequent bath, whether acid or alkaline, should be at a pH whereat sufficient flocculent hydroxide forms to be effective in removal of the spray residue. Usually this can be attained, on the acid side, by employing a solution containing the equivalent of from a half to three per cent of hydrochloric acid. On the alkaline side I have employed alkaline baths as high as pH 12.5.

The treating solution of the present invention can be applied in various ways, such as by spraying the solution on the fruit or by dipping the fruit in a tank of the solution. The time that the fruit must be subjected to the action of the solution is not particularly critical and therefore its value is largely dependent upon the actual speed of the treating equipment employed.

I have found that the amphoteric metal salt treating solution is most effective when slightly acid, and to this end I preferably add a small amount of hydrochloric acid to the solution. When the subsequent treating solution is sodium silicate, better results are also secured because small amounts of silicic acid are formed on the surface of the fruit. Silicic acid is of a colloidal nature and has high absorptive properties for the insoluble spray residues contained on the fruit. This further facilitates the spray residue removal. The addition of a small amount of a light mineral oil in the initial cleansing solution also facilitates spray removal.

The employment of the solutions disclosed herein does not involve a gaseous disintegration or disruption of the spray residue surface, as has been heretofore proposed in those materials employing magnesium carbonate and calcium carbonate with a subsequent acid solution treatment. Instead, the present invention depends upon the formation of highly absorptive colloidal flocs which assist in removal of the spray residues.

The properties of the heavy metals (including aluminum) to form amphoteric hydroxides is well known. I have successfully used salts of such heavy metals as aluminum, chromium, iron and zinc for wetting the fruit initially. Thereafter, the fruit was treated with a solution containing an acid or alkaline hydroxide to form the insoluble, flocculent, adsorptive amphoteric metal hydroxide. The value of this hydroxide lies apparently in its adsorptive capacity which destroys the adherence of the insecticide to itself and to the fruit.

I claim:

1. In a process for removing spray residues from fruit in which the fruit is washed the steps of wetting the fruit with an aqueous solution of a soluble salt selected from the group consisting of zinc, aluminum, trivalent iron and trivalent chromium salts, and washing the so wetted fruit with an alkaline solution while said fruit still carries said soluble salt solution to form on the fruit surface and in said residue a flocculent hydroxide.

2. In a process for removing spray residues from fruit in which the fruit is washed with one or more washing solutions, the steps of wetting the fruit with an aqueous solution of a salt of an amphoteric heavy metal and washing the fruit with a fruit washing solution having an alkaline reaction while said fruit is still wet with the first mentioned solution.

3. In a process of removing spray residue from fruit, wetting the fruit with an aqueous solution of a soluble salt of an amphoteric heavy metal, washing the fruit with water to remove only a portion of said aqueous solution, and wetting the fruit with an alkaline solution to form with residual solution of said salt an amphoteric hydroxide in the spray residue on said fruit.

4. That improvement in removal of strongly adherent, heavy spray residues on fruit which comprises wetting the fruit with an aqueous solution of a salt having as a positive ion one forming a flocculent hydroxide, and then wetting the fruit with an alkaline solution to convert that salt retained by residue on said fruit into said hydroxide.

5. In a process for removing spray residues from fruit in which the fruit is washed with one or more washing solutions, the steps of wetting the fruit with an aqueous solution of a salt of an amphoteric heavy metal and washing the fruit, while said fruit is still wet with the first mentioned solution, with a fruit washing solution of the group consisting of acid and alkaline substances, which reacts with said first mentioned solution to form a flocculent hydroxide in said residue and on said fruit.

6. In a process of removing spray residue from fruit, wetting the fruit with an aqueous solution of a soluble salt of an amphoteric heavy metal, washing the fruit with water to remove only a portion of said aqueous solution, and wetting the fruit with a fruit washing solution of the group consisting of acid and alkaline substances, which reacts with residual solution of said salt to form an amphoteric hydroxide in the spray residue on said fruit.

7. That improvement in removal of strongly adherent, heavy spray residues on fruit which comprises wetting the fruit with an aqueous solution of a salt having as a positive ion one forming a flocculent hydroxide, and then wetting the fruit with a fruit washing solution of the group consisting of acid and alkaline substances, which reacts with that salt retained by residue on said fruit into said hydroxide.

8. In a process for removing spray residues from fruit in which the fruit is washed the steps of wetting the fruit with an aqueous solution of a soluble salt selected from the group consisting of zinc, aluminum, trivalent iron and trivalent chromium salts, and washing the so wetted fruit with an acid solution while said fruit still carries said soluble salt solution to form on the fruit surface and in said residue a flocculent hydroxide.

9. In a process for removing spray residues from fruit in which the fruit is washed with one or more washing solutions, the steps of wetting the fruit with an aqueous solution of a salt of an amphoteric heavy metal and washing the fruit with a fruit washing solution having an acid reaction while said fruit is still wet with the first mentioned solution.

10. In a process of removing spray residue from fruit, wetting the fruit with an aqueous solution of a soluble salt of an amphoteric heavy metal, washing the fruit with water to remove only a portion of said aqueous solution, and wetting the fruit with an acid solution to form with residual solution of said salt an amphoteric hydroxide in the spray residue on said fruit.

11. That improvement in removal of strongly adherent, heavy spray residues on fruit which comprises wetting the fruit with an aqueous solution of a salt having as a positive ion one forming a flocculent hydroxide, and then wetting the fruit with an acid solution to convert that salt retained by residue on said fruit into said hydroxide.

12. In a process for removing spray residues from fruit in which the fruit is washed, the steps of wetting the fruit with an aqueous solution of a soluble salt selected from the group consisting of zinc, aluminum, trivalent iron and trivalent chromium salts, and washing the so wetted fruit with a fruit washing solution of the group consisting of acid and alkaline substances, which reacts with said soluble salt solution to form on the fruit surface and in said residue a flocculent hydroxide.

CLARENCE D. DOLMAN.